(12) United States Patent
Schumacher et al.

(10) Patent No.: US 7,244,302 B2
(45) Date of Patent: Jul. 17, 2007

(54) TITANIUM DIOXIDE COATED WITH SILICON DIOXIDE

(75) Inventors: Kai Schumacher, Hofheim (DE); Christoph Batz-Sohn, Hanau (DE); Steffen Hasenzahl, Morris Plains, NJ (US)

(73) Assignee: Degussa AG, Duesseldorf (DE)

( * ) Notice: Subject to any disclaimer, the term of this patent is extended or adjusted under 35 U.S.C. 154(b) by 0 days.

(21) Appl. No.: 10/539,061

(22) PCT Filed: Dec. 2, 2003

(86) PCT No.: PCT/EP03/13534

§ 371 (c)(1),
(2), (4) Date: Jun. 15, 2005

(87) PCT Pub. No.: WO2004/056927

PCT Pub. Date: Jul. 8, 2004

(65) Prior Publication Data

US 2006/0057385 A1 Mar. 16, 2006

(30) Foreign Application Priority Data

Dec. 23, 2002 (DE) .............................. 102 60 718

(51) Int. Cl.
*C09C 1/36* (2006.01)
*C09C 3/06* (2006.01)
*C01G 23/07* (2006.01)

(52) U.S. Cl. ..................... 106/446; 424/59; 427/219; 428/404

(58) Field of Classification Search .............. 106/446; 424/59; 428/404; 427/219
See application file for complete search history.

(56) References Cited

U.S. PATENT DOCUMENTS

| 3,873,335 | A | * | 3/1975 | Schmidt et al. ............. 106/436 |
| 5,268,337 | A | | 12/1993 | Katz et al. |
| 5,451,390 | A | | 9/1995 | Hartmann et al. |
| 5,922,120 | A | * | 7/1999 | Subramanian et al. ...... 106/437 |
| 6,695,906 | B2 | * | 2/2004 | Hiew et al. ................. 106/446 |
| 6,740,312 | B2 | * | 5/2004 | Chopin et al. ................. 424/59 |
| 2004/0241189 | A1 | * | 12/2004 | Ishii et al. ............... 424/200.1 |
| 2004/0259997 | A1 | * | 12/2004 | Enjalbert et al. ........... 524/430 |
| 2005/0183634 | A1 | * | 8/2005 | Schumacher et al. ........ 106/446 |
| 2006/0116279 | A1 | * | 6/2006 | Kogoi et al. ................ 502/103 |

FOREIGN PATENT DOCUMENTS

| EP | 1 284 277 | 2/2003 |
| EP | 1 321 432 | 6/2003 |
| WO | 96/36441 | 11/1996 |

OTHER PUBLICATIONS

Hung et al. "Formation of mixed oxide powders in flames: Part I. TiO2-SiO2", J. Mater. Res., vol. 7, No. 7, pp. 1861-1869, XP009025974 1992 (no month).

* cited by examiner

*Primary Examiner*—Anthony J. Green
(74) *Attorney, Agent, or Firm*—Oblon, Spivak, McClelland, Maier & Neustadt, P.C.

(57) ABSTRACT

A powder containing particles with a core of titanium dioxide and a coating of silicon dioxide in an amount of between 0.5 and 40 wt. %, the particles have a BET surface of between 5 and 300 m$^2$/g, and the particles are primary particles that have a coating of silicon dioxide and a core of titanium dioxide.

15 Claims, 2 Drawing Sheets

TITANIUM DIOXIDE COATED WITH SILICON DIOXIDE

The present invention provides titanium dioxide powder, which is covered with a silicon dioxide coating and produced by flame hydrolysis, a dispersion containing this powder, as well as the processes for the production of the powder and dispersion. The invention also provides for the use of the powder and dispersion.

Metal oxides such as titanium dioxide or zinc oxide are widely used in sunscreen agents. Their action basically involves reflection, scattering and absorption of the harmful UV radiation and depends substantially on the primary particle size of the metal oxides.

The disadvantage with metal oxides such as titanium dioxide or zinc oxide is their photocatalytic activity, by means of which reactions are triggered that can lead to changes in the constituents of a sunscreen agent.

Attempts have been made to reduce the photocatalytic activity of these metal oxides without reducing the UV-screening properties, by for example covering them with a coating.

It is known to coat titanium dioxide powder with silicon dioxide. As a rule titanium dioxide particles are dispersed in a liquid medium, the coating component is added in the form of a silicate, and silicic acid is precipitated on the surface of the titanium dioxide particles. This may then be followed by heat treatment procedures. Instead of silicates, organosilicon compounds may also be used.

EP-A-0988 853 describes titanium dioxide particles coated with silicon dioxide, as well as their production and use as a constituent in sunscreen agents.

The disadvantage with these particles is their low surface functionality and the high degree of intergrowth of the particles. On the one hand this complicates the incorporation of the particles in a cosmetic formulation, and on the other hand restricts their stability as regards sedimentation.

These disadvantages are largely overcome in the European patent application having the Application No. 01119108.7 of Aug. 8, 2002. The titanium dioxide particles coated with silicon dioxide that are described there can easily be incorporated in cosmetic formulations, and are stable in the latter and have a low photocatalytic activity.

The disadvantage with the processes in which the coating is applied from a liquid phase remains however the reproducibility. Titanium dioxide powders tend to form aggregates in the liquid dispersion phase. The titanium dioxide produced by flame hydrolysis that is preferably used in addition exhibits an aggregated structure. This means that the coating in each case surrounds aggregates and/or agglomerates. The structure of the aggregates and agglomerates is however strongly dependent on the conditions during the reaction, for example the pH value or dispersion energy. It is therefore difficult to obtain a uniform powder in a reproducible manner.

In addition to the processes in which the coating is applied from a liquid medium, processes also exist in which titanium dioxide particles coated with silicon dioxide are produced in gaseous phase reactions.

Hung and Katz (U.S. Pat. No. 5,268,337) and J. Mater. Res. 7, 1861 (1992)) describe the production of titanium dioxide particles coated with silicon dioxide in a flame hydrolysis process. For this purpose a burner is used, in which the precursors of the titanium dioxide and silicon dioxide together with the combustible gas and an inert gas as stream 1 and an oxidising gas as stream 2 are fed in countercurrent and a diffusion flame is ignited at the point of impact of the two streams. If titanium tetrachloride and silicon tetrachloride are used as precursors in a ratio of $SiCl_4$ to $TiCl_4$ of 1:1 to 3:1 and the flame temperature lies between 500° and 2300° K., the formation of a complete silicon dioxide coating takes place. The titanium dioxide core is in this connection present in the rutile configuration. If the proportion of silicon dioxide is less, then simply the formation of silicon dioxide domains on the titanium dioxide surface occurs.

The disadvantage with this process is that the burner with a countercurrent diffusion flame can be adapted only with difficulty to larger, economically operating burners. A further disadvantage is the larger proportion of silicon dioxide precursors that is necessary in order to obtain a fully formed coating.

A further possible way of producing titanium dioxide particles coated with silicon dioxide is the gaseous phase oxidation, described in WO 96/36441, of a thermally decomposable titanium dioxide precursor and a thermally decomposable silicon dioxide precursor with oxygen in a tubular reactor at temperatures of at least 1300° C. In this, there takes place first of all the oxidation of the titanium dioxide precursor with the formation of titanium dioxide particles, and only then is the silicon dioxide precursor added to the reaction mixture.

The disadvantage of this process is that the use of a tubular reactor leads to non-uniform products. This is due to the fact that the residence time of titanium dioxide particles formed by hydrolysis of the titanium dioxide precursor is not uniform in the tubular reactor, and therefore results in titanium dioxide cores of varying structure.

These in turn are not uniformly coated with silicon dioxide on account of the non-uniform residence time over the reactor cross-section. The result is a non-uniform product as regards the titanium dioxide core and the silicon dioxide coating. In addition there is also the fact that under the reaction conditions adhesions of undefined products on the reactor wall that can be incorporated into the product have to be reckoned with. The process described in WO 96/36441 accordingly does not prove to be an advantageous way of obtaining a uniform product.

The object of the present invention is to provide a titanium dioxide powder coated with silicon dioxide that does not have the disadvantages of the prior art. In particular, it should have a complete silicon dioxide coating of largely uniform thickness, a low photocatalytic activity, and should be able to be produced in a reproducible manner.

Figure 1:
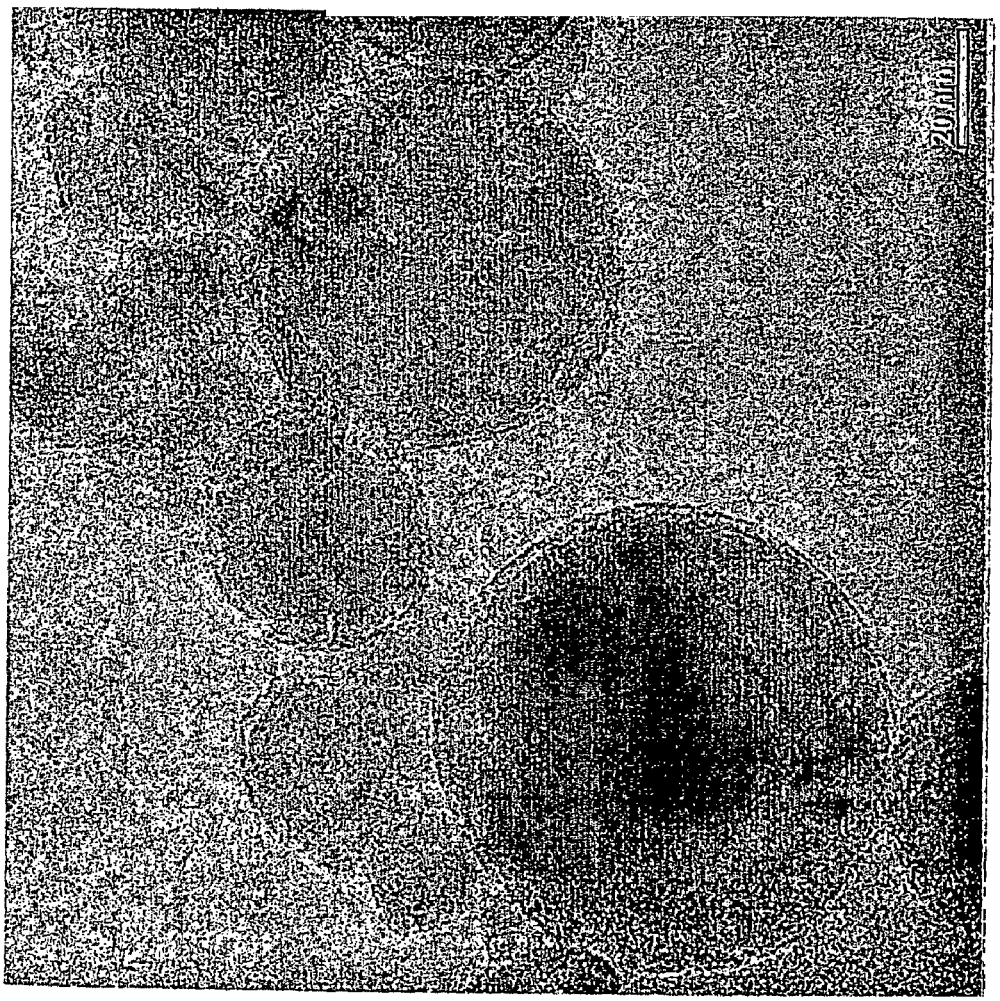
FIG. 1 shows a TEM image of the powder from Example 1.

The invention accordingly provides a powder consisting of particles with a core of titanium dioxide and a coating of silicon dioxide, which is characterised in that it contains a proportion of silicon dioxide between 0.5 and 40 wt. %, has a BET surface between 5 and 300 $m^2/g$, and consists of primary particles that have a coating of silicon dioxide and a core of titanium dioxide.

The proportion of silicon dioxide in the powder according to the invention is between 0.5 and 40 wt. %. With values below 0.5 wt. % it cannot be ensured that a completely closed silicon dioxide coating is present. With values above 40 wt. % the titanium dioxide powders coated with silicon dioxide tend to have too low a UV absorption. The BET surface of the powder according to the invention is determined in accordance with DIN 66131.

Primary particles are understood to denote very small particles that cannot be decomposed further without rupturing chemical bonds.

These primary particles may grow together to form aggregates. Aggregates are characterised by the fact that their surface is less than the sum of the surfaces of the primary particles of which they are composed. Furthermore aggregates do not decompose completely into primary particles on dispersion. Powders according to the invention having a low BET surface may be present wholly or largely in the form of non-aggregated primary particles, while powders according to the invention with a high BET surface may have a relatively high degree of aggregation or may be present in a completely aggregated form.

The aggregates preferably consist of primary particles that grow together through their silicon dioxide coating. Powders according to the invention based on such an aggregate structure exhibit a particularly low photoactivity with a high absorption.

In addition the powder according to the invention may preferably have a silicon dioxide content of 1 to 20 wt. %.

The ratio of the rutile/anatase modifications of the titanium dioxide core of the powder according to the invention may be varied within wide limits. Thus, the ratio of the rutile/anatase modifications may be 1:99 to 99:1, preferably 10:90 to 90:10. The titanium dioxide modifications exhibit different degrees of photoactivity. On account of the broad limits of the ratio of the rutile/anatase modifications, together with the silicon dioxide content of the coating, powders may specifically be selected for example for use in sunscreen agents.

The powder according to the invention may preferably have an absorption at 320 nm of at least 95%, particularly preferably of at least 97%, and at 360 nm may preferably have an absorption of at least 90%, particularly preferably at least 92%. The absorption is in each case determined in an aqueous dispersion of the powder with a solids content of 3 wt. %.

The powder according to the invention may preferably have a photoactivity index of less than 0.5, particularly preferably less than 0.3.

In the determination of the photoactivity index the sample to be measured is suspended in 2-propanol and irradiated for 1 hour with UV light. The concentration of acetone that is formed is then measured.

The photoactivity index is the quotient of the acetone concentration determined when using a powder and the acetone concentration determined when using titanium dioxide P25, a pyrogenically produced titanium dioxide from Degussa.

The acetone concentration in mg/kg may be used as a measure of the photocatalytic activity of the sample since the formation of acetone can be described by a reaction of zero order kinetics according to the equation $dc[Ac]/dt=k$.

The isoelectric point (IEP) of the powder according to the invention may preferably lie at a pH value between 1 and 4, particularly preferably between 2 and 3.

Stable dispersions may thereby be produced for example in the range between pH 5 and 7 of interest for sunscreen agents. Titanium dioxide particles without a coating lead to unstable dispersions in this pH range unless further additives are added to the dispersion.

The IEP indicates the pH value at which the zeta potential is zero. The IEP in the case of titanium dioxide is at a pH of ca. 5 to 6, and in the case of silicon dioxide is at a pH of ca 2 to 4. In dispersions in which the particles carry acidic or basic groups on the surface, the charge can be altered by adjusting the pH value. The greater the difference between the pH value and the IEP, the more stable the dispersion.

The zeta potential is a measurement of the surface charge of particles. The zeta potential denotes the potential at the shear plane within the electrochemical double layer consisting of particles of the powder according to the invention and electrolyte in a dispersion. The zeta potential depends inter alia on the nature of the particle, for example silicon dioxide, titanium dioxide or titanium dioxide coated with silicon dioxide. Particles of the same material have the same sign of the surface charges and thus repel one another. If the zeta potential is too small, the repulsive force may however not be sufficient to compensate the van der Waals attraction of the particles, resulting in flocculation and possibly sedimentation of the particles.

The zeta potential of the powder according to the invention is determined in an aqueous dispersion.

Moreover the powder according to the invention preferably has a BET surface of 40 to 120 $m^2/g$, particularly preferably between 60 and 70 $m^2/g$.

The invention also provides a process for the production of the powder according to the invention, which is characterised in that a vaporisable silicon compound and a vaporisable titanium compound are mixed in amounts corresponding to the subsequently desired ratio of $SiO_2$ and $TiO_2$ in the product, are vaporised at temperatures of 200° C. or less, and are transferred by means of an inert gas stream together with hydrogen and air or with oxygen-enriched air to the central pipe (core) of a known burner, the reaction mixture is ignited at the mouth of the burner and is introduced together with secondary air, is combusted in a cooled flame pipe, following which the titanium dioxide powder coated with silicon dioxide is separated from the gaseous reaction products and if necessary is freed in moist air from adhering hydrogen chloride, wherein the ratio of primary air to secondary air is greater than 0.3, core hydrogen to secondary air is greater than 1, titanium dioxide precursor to secondary air is greater than 0.5

It has been found that the powder according to the invention is obtained only if all the specified parameters are observed. If there are fluctuations, then powders and powder mixtures not in accordance with the invention are obtained. Thus, for example, without the addition of secondary air and without observing the ratios of secondary air to primary air/core hydrogen/titanium dioxide precursor, silicon/titanium mixed oxide powders are obtained in which silicon and titanium are homogeneously distributed. Such a mixed oxide powder is described in DE-A-4235996.

The type of vaporisable titanium compound in the production of the powder according to the invention is not restricted. Titanium tetrachloride may preferably be used.

The type of vaporisable silicon compound is likewise not restricted. Silicon tetrachloride may preferably be used.

The invention also provides sunscreen agents that contain-the powder according to the invention in an amount of 0.01 to 25 wt. %. In addition the sunscreen agent according to the invention may be used in mixtures with known inorganic, UV-absorbing pigments and/or chemical UV filters.

Suitable known UV-absorbing pigments include titanium dioxides, zinc oxide, aluminium oxides, iron oxides, cerium oxides, zirconium oxides, barium sulfate or mixtures thereof.

As chemical UV filters there may be used all water-soluble or oil-soluble UV-A and UV-B filters known to the person skilled in the art. Selected examples that may be mentioned include: 2-hydroxy-4-methoxybenzophenone, 2-hydroxy-4-methoxybenzophenone-5-sulfonic acid, 2-hydroxy-4-methoxybenzophenone-5-sulfonate sodium salt, dihydroxydimethoxybenzophenone, dihydroxydimethoxybenzophenonesulfonate sodium salt, tetrahydroxybenzophenone, p-aminobenzoic acid, ethyl-p-aminobenzoate, glyceryl-p-aminobenzoate, amyl-p-dimethylaminobenzoate, octyl-p-dimethylaminobenzoate, ethyl-p-methoxycinnamate, isopropyl-p-methoxycinnamic acid ester, octyl-p-methoxycinnamic acid ester, 2-ethylhexyl-p-methoxycinnamic acid ester, p-methoxycinnamic acid ester sodium salt, glyceryl-di-p-methoxycinnamic acid ester, mono-2-ethylhexanoate, octyl salicylate, phenyl salicylate, homomenthyl salicylate, dipropylene glycol salicylate, ethylene glycol salicylate, myristyl salicylate, methyl salicylate, 4-tert.-butyl-4-methoxydibenzoylmethane and 2-(2'-hydroxy-5'-methylphenyl)-benzotriazole. Of these, 2-ethylhexyl-p-methoxycinnamic acid ester and 4-tert.-butyl-4'-methoxydibenzoylmethane are preferred on account of their UV protection and the fact that they are harmless to skin.

The sunscreen agents according to the invention may furthermore contain the solvents known to the person skilled in the art, such as water, monohydric or polyhydric alcohols, cosmetic oils, emulsifiers, stabilisers, consistency regulators such as carbomeres, cellulose derivatives, xantham gum, waxes, bentones, pyrogenic silicic acids and further substances conventionally used in cosmetics, such as vitamins, antioxidants, preservatives, colourants and perfumes.

Typically the sunscreen agent according to the invention may be present as an emulsion (O/W, W/O or multiple), an aqueous or aqueous-alcoholic gel or oil gel, and may be presented in the form of lotions, cremes, milk sprays, mousse, as a stick, or in other conventional forms.

The general structure and formulation of sunscreen agents is furthermore described in A. Domsch, "Die kosmetischen Präparate", Verlag für chemische Industrie (Editor: H. Ziolkowsky), 4$^{th}$ Edition, 1992 or N. J. Lowe and N. A. Shaat, Sunscreens, Development, Evaluation and Regulatory Aspects, Marcel Dekker Inc., 1990.

The invention in addition provides for the use of the powder according to the invention as a UV filter, and for the production of dispersions and use for chemical-mechanical polishing (CMP process).

The process according to the invention permits the production of titanium dioxide particles completely coated with silicon dioxide, wherein only minor amounts of silicon dioxide precursors are necessary. With known processes in which the production is carried out pyrogenically, substantially larger amounts of silicon dioxide precursors are necessary in order to achieve a complete coating. This in turn reduces the UV absorption of the powders according to the prior art.

The unique structure of the powder according to the invention, in which the primary particles already have a sealed coating, also means that, in the event of a possible aggregation of the primary particles, no aggregation of the titanium dioxide cores is possible. With the known powders, which are obtained by coating a titanium dioxide core in an aqueous medium, as a rule there is an aggregation of the initial titanium dioxide powders, or aggregated powders are used to start with. In these processes aggregates are thus coated, and not primary particles as in the case of the process according to the invention.

On the basis of the facts known from DE-A-4235996 it was not expected that a completely different powder would be formed by addition of secondary air under specifically defined ratios to the rest of the gases that are used. Whereas the process described in DE-A-4235996 leads to a mixed oxide powder with an homogeneous distribution of titanium dioxide and silicon dioxide, the process according to the invention produces a powder with a complete coating of silicon dioxide and a core of titanium dioxide.

EXAMPLES

Analytical Measurements

The titanium dioxide and silicon dioxide contents are determined by means of X-ray fluorescence analysis.

The BET surface is determined according to DIN 66131.

The dibutyl phthalate absorption (DBP number) is measured using a RHEOCORD 90 instrument from Haake, Karlsruhe. For this purpose 16 g of the silicon dioxide powder are weighed out to an accuracy of 0.001 g and added to a kneading chamber, which is closed with a lid and into which dibutyl phthalate is metered in at a predetermined metering rate of 0.0667 ml/sec through a hole in the lid. The kneader is operated at a motor speed of 125 rpm. After the maximum torque is reached the kneader and the DBP metering device are automatically switched off. The DBP absorption is calculated as follows from the consumed amount of DBP and the weighed-out amount of the particles:

DBP number (g/100 g)=(consumption of DBP in g/weighed-out amount of powder in g)×100.

The pH value is determined in accordance with DIN ISO 787/IX, ASTM D 1280, JIS K 5101/24.

Determination of the photoactivity index: ca 250 mg (accuracy 0.1 mg) of the particles obtained from the examples and comparison examples are suspended in 350 ml (275.1 g) of 2-propanol using an ultra-turrax stirrer. This suspension is conveyed by means of a pump through a cooler thermostatically controlled to 24° C. into a glass photoreactor previously flushed with oxygen.

An Hg medium pressure TQ718 type immersion lamp (Heraeus) with an output of 500 watt is used for example as radiation source. A protective tube of boron silicate glass restricts the emitted radiation to wavelengths >300 nm. The radiation source is surrounded externally by a cooling pipe through which water flows.

Oxygen is metered into the reactor through a flow meter. The reaction is started when the radiation source is switched on. At the end of the reaction a small amount of the suspension is immediately removed, filtered and analysed by means of gas chromatography.

UV-visible wavelength spectra (absorption) are measured in 3 wt. % dispersions using a Specord 200 UV-visible range spectrophotometer with a photometer sphere (Analytikjena AG).

The zeta potential and the isoelectric point are determined according to the DVI method in a 10% aqueous dispersion of the powders according to the invention using a DT-1200 type instrument from Dispersion Technology Inc.

Example 1

3.86 kg/hour of $TiCl_4$ and 0.332 kg/hour of $SiCl_4$ are vaporised at ca. 200° C. in a vaporiser. The vapours are mixed by means of nitrogen together with 1.45 $Nm^3$/hour of hydrogen and 7.8 $Nm^3$/hour of dried air in the mixing chamber of a burner of known design and construction and fed, through a central tube at whose end the reaction mixture is ignited, to a water-cooled flame tube, where they are combusted. In addition 0.9 $Nm^3$/hour of hydrogen and 25 $Nm^3$/hour of air are fed to the flame tube through a jacket tube concentrically surrounding the central tube.

The powder that is formed is then separated in a filter. Adhering chloride is removed by treating the powder with moist air at ca. 500-700° C. The powder contains 92 wt. % of titanium dioxide and 8 wt. % of silicon dioxide.

The Examples 2 to 5 are carried out similarly to Example 1. The batch sizes and the experimental conditions are given in Table 1, and the physicochemical properties of the powders according to the invention are given in Table 2.

TEM-EDX evaluations of the powders of Examples 1 to 5 show a largely aggregated powder with a complete silicon dioxide coating and a titanium dioxide core. FIG. 1 shows a TEM image of the powder from Example 1. Aggregates are present in the powder, the primary particles forming intergrowths via the silicon dioxide coating. The BET surface is 66 $m^2$/g. X-ray diffraction analysis shows a rutile/anatase ratio in the core of 26:74.

Figure 2:
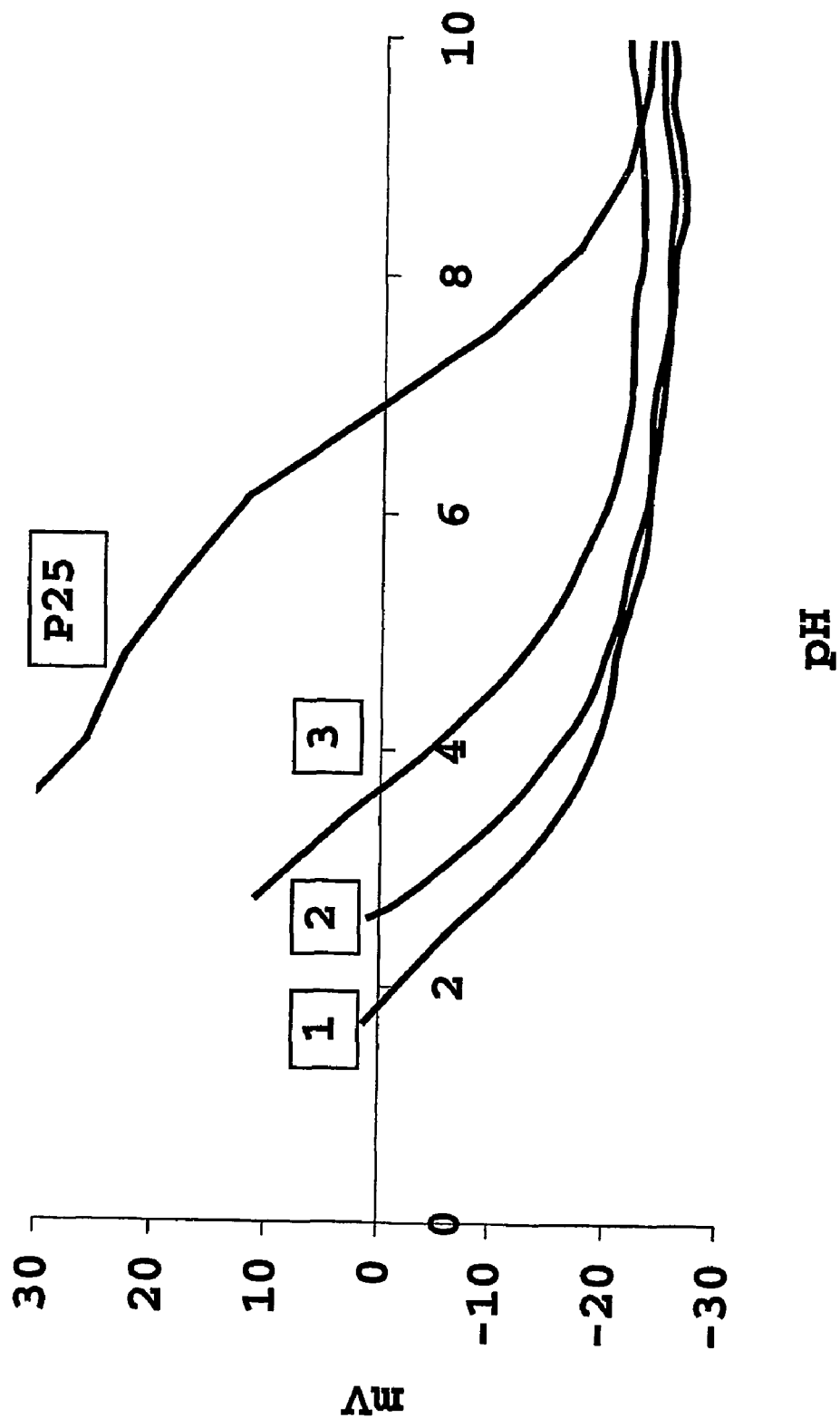
FIG. 2 shows the zeta potential curves of the powders according to the invention of Examples 1 to 3 compared to titanium dioxide (P25 $TiO_2$ from Degussa).

FIG. 2 shows the zeta potential curves of the powders according to the invention of Examples 1 to 3 compared to titanium dioxide (P25 $TiO_2$ from Degussa). It can be seen that, with increasing content of silicon dioxide, the isoelectric point is displaced towards lower pH values and even at the low $SiO_2$ contents of the powders of Examples 1 to 3 is in the pH range below 3. Since the isoelectric point is an important parameter for the stability of dispersions, it is possible to stabilise the powders according to the invention with small amounts of silicon dioxide in the physiologically relevant pH range from ca. 5 to 7. Dispersions of titanium dioxide exhibit the lowest stability in this range.

The powders according to the invention of Examples 1 to 3 exhibit a significantly lower photoactivity than pyrogenically produced P25 titanium dioxide from Degussa.

The powders according to the invention from Examples 1 to 3 exhibit a very high UV absorption, which at 320 nm is greater than 97% and at 360 nm is greater than 90%.

Due to the high UV absorption and the low photoactivity the powders according to the invention are ideally suitable for sunscreen formulations.

The DBP absorption of the powders according to the invention of Examples 1 to 3 is slight or not measurable. This indicates a low degree of intergrowth.

Example 6

Sunscreen Agent

A sunscreen agent containing 4 wt. % of the powder according to the invention of Example 1 was prepared according to the following formulation (values in brackets in wt. %). Phase A: Isolan GI 34 (3.0), castor oil (1.2), Tegesoft OP (10.0), Tegesoft Liquid (5.0), glycerol 86% (3.0), Phase B: Paracera W80 (1.8), isohexadecane (5.0), Phase C: powder according to the invention of Example 1 (4.0), Phase D: magnesium sulfate (0.5), fully deionised water (66.5).

Phase A is heated in a mixer to 70° C. Phase B is melted on a magnetic heating plate at 80° C. and then added to Phase A. Phase C is stirred into the oily phase at ca. 300 rpm and under a vacuum. Phase D is also heated to 70° C. and added under a vacuum to the mixture of A-C.

TABLE 1

Experimental conditions in the production of the powders 1 to 5

| Example | $TiCl_4$ kg/hr | $SiCl_4$ kg/hr | Vaporiser Temperature ° C. | $H_2$ Core $Nm^3$/hr | $H_2$ Jacket $Nm^3$/hr | Air Core $Nm^3$/hr | Secondary Air $Nm^3$/hr | Inert Gas Core $Nm^3$/hr | Inert Gas Jacket $Nm^3$/hr |
|---|---|---|---|---|---|---|---|---|---|
| 1 | 3.86 | 0.4 | 140 | 1.45 | 0.9 | 7.7 | 25 | 0.2 | 0.5 |
| 2 | 3.86 | 0.2 | 135 | 1.45 | 0.9 | 7.7 | 25 | 0.2 | 0.5 |
| 3 | 3.86 | 0.11 | 137 | 1.45 | 0.9 | 7.7 | 25 | 0.2 | 0.5 |
| 4 | 3.86 | 0.81 | 131 | 1.45 | 0.9 | 8 | 20 | 0.2 | 0.5 |
| 5 | 3.86 | 1.15 | 133 | 1.45 | 0.9 | 8.3 | 20 | 0.2 | 0.5 |

TABLE 2

Physico-chemical data of the powders 1 to 5

| Example | $TiO_2$ Content Wt. % | $SiO_2$ Content Wt. % | BET $m^2$/g | Photoactivity Index | Absorption [1] % | pH | DBP No. g/100 g |
|---|---|---|---|---|---|---|---|
| 1 | 92.67 | 7.33 | 66 | 0.26 | 97.3/90.4 | 3.69 | 121 |
| 2 | 96.19 | 3.8 | 62 | 0.46 | 97.4/92.8 | 3.98 | n.m. [2] |
| 3 | 97.83 | 2.13 | 57 | 0.49 | 97.9/93.3 | 4.27 | n.m. [2] |
| 4 | 87.29 | 12.67 | 59 | — | — | 3.75 | — [3] |
| 5 | 80.85 | 19.15 | 68 | — | — | 3.89 | — |

[1] Absorption at 320/360 nm; 3 wt. % dispersion in $H_2O$;
[2] n.m. = not measurable;
[3] — = not measured

The invention claimed is:

1. A powder comprising particles with a core of titanium dioxide and a coating of silicon dioxide, wherein
   the silicon dioxide is present in an amount of between 0.5 and 40 wt. %,
   the particles have a BET surface of between 5 and 300 $m^2$/g, and
   the particles are primary particles that have a coating of silicon dioxide and a core of titanium dioxide.

2. The powder according to claim 1, wherein the primary particles can grow together to form aggregates.

3. The powder according to claim 1, wherein the silicon dioxide is present in the powder in an amount of 1 to 20 wt. %.

4. The powder according to claim 1, wherein the titanium dioxide core has a ratio of the rutile/anatase modifications of 1:99 to 99:1.

5. The powder according to claim 1, wherein an aqueous dispersion of the powder with a solids content of 3 wt. % has an absorption of at least 95% at 320 nm and an absorption of at least 90% at 360 nm.

6. The powder according to claim 1, which has a photo-activity index of less than 0.5.

7. The powder according to claim 1, which has an isoelectric point at a pH value of between 1 and 4.

8. The powder according to claim 1, wherein the BET surface is between 40 and 120 $m^2/g$.

9. An aggregate of particles comprising the powder according to claim 2 and wherein the primary particles have grown together via the silicon dioxide coating.

10. A sunscreen agent comprising the powder according to claim 1 in an amount of between 0.01 and 25 wt. % based on the weight of the sunscreen agent; and one or more of a UV-absorbing pigment, chemical UV filter, and a solvent.

11. A process for the production of the powder according to claim 1, comprising
mixing a vaporisable silicon compound and a vaporisable titanium compound corresponding to a subsequently desired ratio of $SiO_2$ and $TiO_2$ in the powder,
vaporizing the mixture at a temperature of 200° C. or less transferring the vaporized mixture in an inert gas stream together with hydrogen and air or with oxygen-enriched air into a central pipe of a burner forming a reaction mixture,
igniting the reaction mixture at mouth of the burner in the presence of additional, secondary air,
combusting the reaction mixture in a cooled flame pipe generating gaseous reaction products, removing the titanium dioxide powder coated with silicon dioxide from the gaseous reaction products, wherein the ratio of
air to secondary air is greater than 0.3,
hydrogen to secondary air is greater than 1,
vaporisable titanium dioxide compound to secondary air is greater than 0.5.

12. The process according to claim 11, wherein titanium tetrachloride is the titanium compound.

13. The process according to claim 11, wherein silicon tetrachloride is the silicon compound.

14. The process according to claim 11, further comprising freeing the gaseous reaction product from adhering hydrogen chloride following the removal of the titanium dioxide powder coated with silicon dioxide from the gaseous reaction products.

15. A method of making a dispersion, comprising mixing the powder according to claim 1 with a solvent.

* * * * *